Patented Apr. 27, 1954

2,676,945

UNITED STATES PATENT OFFICE 2,676,945

CONDENSATION POLYMERS OF HYDROXYACETIC ACID

Norton A. Higgins, Wilmington, Del., assignor to E. I. du Pont de Nemours and Company, Wilmington, Del., a corporation of Delaware No Drawing. Application October 18, 1950, Serial No. 190,877

15 Claims. (Cl. 260—45.7)

This invention relates to condensation polymers of hydroxyacetic acid, and relates more particularly to a new plastic material, polyhydroxyacetic ester, a highly polymerized linear condensate resulting from esterification reactions between molecules of hydroxyacetic acid, and to processes for preparing it.

Hydroxyacetic acid, also known as glycolic acid, is capable of condensation reactions at either end of the molecule, with elimination of water, to form a variety of products. Thus Heintz Annalen der Physik und Chemie, volume 115, page 461, when translated, states that, "By heating the hydrate of glycolic acid at 200–240° C. some diglycolic acid forms, but in two small a quantity under these conditions for use in preparation of the acid. By continued heating, glycolide is prepared, however, which is a very dark brown color." Diglycolic acid results from the removal of one molecule of water from the alcoholic hydroxyl groups of two molecules of hydroxyacetic acid to produce an ether linkage. Glycolide results from an esterification reaction between two molecules of hydroxyacetic acid, forming hydroxyacetoxyacetic acid, followed by a self-esterification to produce a six-membered, lactide-type ring of the formula $C_4H_4O_4$. Pure glycolide is colorless and the discoloration observed by Heintz is evidence of decomposition reactions with tar formation.

British Patent 550,837, issued to the assignee of the present application, discusses other known reactions between molecules of hydroxyacetic acid. Of especial interest, this patent discloses the formation of linear condensation products having melting points of 180° to 215° C. by repeated esterification of end hydroxyl groups with successive molecules of hydroxyacetic acid to form linear chains of the type represented by the following structural formula:

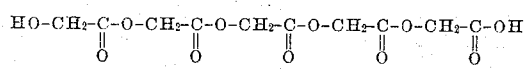

A two step process is disclosed for preparing these products. In the first step hydroxyacetic acid or a partially dehydrated product thereof is heated under atmospheric or higher pressure to a temperature between 180° C. and 230° C. until there remains not more than 25%, and preferably less than 15%, of the combined water present in hydroxyacetic acid. By combined water is meant the one molecule of water per molecule of hydroxyacetic acid which can theoretically be removed in such condensation reactions. The use of 0.001% to 0.5% of phosphoric acid or p-toluene-sulfonic acid or sulfuric acid catalyst to promote the removal of water is suggested.

The second step of the process disclosed in the patent is heating the product of the first step under a pressure of 5 to 100 mm. of mercury absolute to a temperature between 200° C. and 250° C. preferably while introducing an inert fluid, such as nitrogen, etc., as a water carrier to remove the major portion of the remaining combined water and volatile low molecular weight substances resulting from side reactions of the types mentioned previously. Preferably this heating step is continued until not more than 5% of combined water remains.

Liebig's Annalen der Chemie, volume 279, pages 46 to 48, reports experiments of Bischoff and Walden by which polyglycolides were prepared. A translation of that portion of the report concerned with the products of highest melting point is, "Glycolide M. P. 86–87° upon distillation in air yields polyglycolide (M. P. 223°), which gives best crystals from hot nitrobenzene. Also by warming glycolide in a pressure tube with or without $ZnCl_2$ the same result was obtained at 120–150° C."

Although the melting points given for the products disclosed by the British patent (up to 215° C.) and by Liebig (223° C.) are considerably higher than that of the dimer, glycolide (86–87° C.), indicating a considerably higher molecular weight, nevertheless those products are not of sufficiently high molecular weight to have plastic properties, i. e., they are not capable of being spun into flexible, strong, orientable fibers, or of being formed into stable, self-supporting thin films, or of being molded into tough, adherent shapes. The prior art products were suitable only for quite different purposes, as is indicated by the sole statement regarding use in the British patent that, "Products having such high melting points are particularly useful in compositions such as baking powders which require as an alkali acceptor, a stable acid more or less insensitive to water at room temperature, whose acidic function is only slowly available, but whose total acidity is high."

Accordingly it is an object of the present invention to provide polyhydroxyacetic esters having plastic properties. Another object is to provide polyhydroxyacetic esters capable of being melt extruded into strong, self-supporting fibers and films. Another object is to provide tenacious shaped articles of polyhydroxyacetic ester. Another object is to provide self-supporting, transparent, thin films of polyhydroxyacetic ester. Another object is to provide strong orientable fibers of polyhydroxyacetic ester. A further object is to provide processes for polymerizing hydroxyacetic acid to prepare polyhydroxyacetic esters of the above plastic properties. Other objects of the invention will become apparent from the following description and claims.

There are a number of properties necessary in a material which is to be a useful plastic, most of which can best be evaluated by observing the behavior of the material during forming operations, such as extrusion or molding, and by actual tests in service, or tests which simulate service requirements, of the resulting shaped products. Much of the information of such tests cannot be reduced to numbers for comparing products. For control purposes and definition of useful limits, it is desirable to have a simple indirect method of evaluation which gives numerical values.

In the case of polyhydroxyacetic esters the most characteristic single indication of plastic properties is the ability of a polymer to form a highly viscous melt. Since the polymers degrade with increasing rapidity as the temperature is raised above the melting point, a standard temperature of 245° C. was selected for comparative tests. This is near the melting point, but is sufficiently above it to avoid melting difficulties. It has been found that, at 245° C., a polyhydroxyacetic ester must have a melt viscosity measured by the method of Flory (Jour. Amer. Chem. Soc. 62, 1057 (1940)), of at least 400 poises for molding into useful shaped articles, the preferred viscosity range being from 1000 to 10,000 poises for extrusion into fibers and films. Below these limits the polymer melt is too fluid and non-adherent to handle properly during forming operations, and the shaped products become increasingly brittle, non-cohesive and weak as the melt viscosity drops below 400 poises. On the other hand, the melt viscosity can be so high that the polymer is difficult to mold or extrude.

An indication of the degree of polymerization attained is provided by solution viscosity measurements. According to Staudinger's work with other polymers, the molecular weight of a high-molecular weight polymer is directly proportional to a value designated as the intrinsic viscosity. A method for determining the intrinsic viscosity of polyhydroxyacetic acid is based on determination of the viscosity of solutions of the polymer in Formal solvent (10 parts phenol and 7 parts trichlorophenol) and a subsequent correction of the viscosity for the amount of degradation the polymer undergoes during the time the solutions are being prepared, e. g., 20 minutes.

A viscosimeter flow time is determined at 30° C. for the solvent and for 0.1%, 0.2% and 0.5% solutions prepared under standard conditions. The specific viscosity $\eta_{sp}$, is equal to the solution flow time minus the solvent flow time and divided by the solvent flow time for the particular solution concentration, C. A graphical plot of $\eta_{sp}/C$ vs. C is prepared and a straight line is drawn through the points for the three concentrations and extended back to zero concentration. The intercept at zero concentration is the intrinsic viscosity $[\eta]$, uncorrected for polymer degradation. The correction for degradation is made by preparing a plot of $\eta_{sp}/C$ for 0.5% solutions vs. various times taken for preparing the solutions, e. g., 20, 30 and 40 minutes. A straight line drawn through these points to intercept the zero time axis will then enable one to read off the viscosity correction for the degradation occurring during the time required for preparing the 0.1%, 0.2% and 0.5% solutions. This correction is usually small but significant, and is added to the value for the intrinsic viscosity determined as indicated above. Corrected values are intended wherever intrinsic viscosities are given.

If the Staudinger equation for other polymers also applies to polyhydroxyacetic esters, the intrinsic viscosity is directly proportional to the molecular weight and affords a valuable means for measuring the degree of polymerization. Independent confirmation that the equation does apply has been obtained by infrared spectra absorption measurements. Absorption in the 2.88 micron band of the spectrum is characteristic of O—H linkages and absorption in the 4.66 micron band of the spectrum is characteristic of C—O—C linkages in a molecule. It will be seen from the structural formula of the polymer given previously that, as the chain length of the molecule increases, the number of O—H linkages per chain remains constant and the number of C—O—C linkages increase in direct proportion to the molecular weight. Hence measurement of the absorption effects of two polymers on the relative intensities of the 2.88 micron band and the 4.66 micron band will indicate the relative molecular weights. The technique of making such measurements is well known.

In accordance with the present invention, polyhydroxyacetic esters having plastic properties, characterized by melt viscosities in excess of 400 poises and highly polymerized, as indicated by intrinsic viscosities in excess of 0.5, are prepared by a process which comprises heating and distilling water from hydroxyacetic acid at substantially atmospheric pressure and at temperatures of 160° to 230° C. until rapid evolution of water ceases, heating and distilling glycolide from the resulting material under vacuum and at temperatures above the melting point of the material but below 245° C. until appreciable evolution of glycolide ceases, cooling the material, powdering the material, and heating the powder at temperatures above 215° C. but below the melting point for sufficient time to form a polyhydroxyacetic ester having the desired melt viscosity. By controlling the process to give suitable melt viscosities, polymers are obtained which are readily melt extruded into strong, self-supporting fibers and films. Films suitable for wrapping tissue, having a thickness of the order of 1 mil, can be prepared. The fibers and films can be oriented by drawing at moderate temperatures to obtain an improvement in strength and other properties. The polymers can also be molded by conventional methods into tough shaped articles.

The initial step of the process starts the polymerization reaction and removes most of the resulting water of reaction. This step is preferably carried out at atmospheric pressure. The use of vacuum here would considerably reduce the ultimate yield of polyhydroxyacetic ester because of low molecular weight polymerization products of hydroxyacetic acid distilling over with the water. On the other hand, the use of pressure is not desirable because it favors decomposition of the hydroxyacetic acid, followed by tar formation and discoloration of the ultimate product. Water starts to distill when the temperature reaches about 160° C. but most of the heating is preferably at 195° to 205° C. Heating for any length of time at temperatures below 195° C. unnecessarily prolongs the time required for removal of water in this step, which should only take from 0.5 to 2.5 hours, depending upon the temperature and size of the batch. Heating at temperatures above 205° C. favors undesired side reactions, such as the formation of gylcolide, which becomes excessive at temperatures above 230° C.

It is believed that glycolide is formed primarily in the very first part of the reaction when the extent of its formation is dependent upon the relative activation energies of the following reactions:

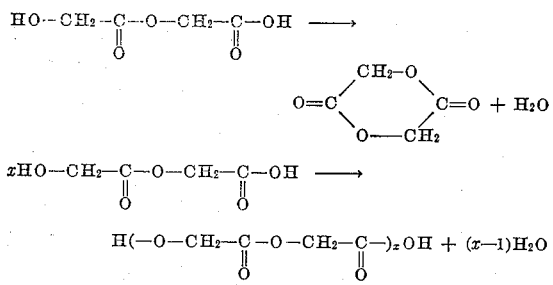

The second reaction is definitely favored at temperatures in the vicinity of 200° C.

The second step of the process is a melt polymerization to a fairly high degree of polymerization as indicated by intrinsic viscosities in the vicinity of 0.3. It is conducted under a vacuum sufficient to remove most of the products of side reactions, such as glycolide. Preferably a high vacuum, within the range of 0 to 5 mm. of mercury absolute pressure, is used. A vacuum as low as 200 mm. of mercury can be used if an inert gas, such as nitrogen, is used to agitate the material and carry away the by-products. In this part of the process polymerization must be carried to as high an intrinsic viscosity as possible without objectionable discoloration of the material, if the subsequent powder polymerization is to be effective. If for any reason the material crystallizes during this step before becoming quite viscous, it is impossible to obtain a high melt viscosity by subsequent powder polymerization. During melt polymerization the system is in a highly metastable condition, and seeding any time after about 45 minutes will bring about solidification. If this happens, polymerization ceases, and further polymerization in powder form is useless. At temperatures around 220° C. there is usually no difficulty in keeping the material molten until no further glycolide distills. This involves a total time for melt polymerization under vacuum of about 6 to 12 hours, depending primarily on the size of the batch. Thereafter the material suddenly becomes more viscous and solidification occurs spontaneously.

The preferred heating cycle during melt polymerization is to keep the temperature within the range of 195° to 220° C., raising the temperature as necessary to keep the material molten. A suitable procedure is to heat at about 200° C. for about 1 hour and then raise the temperature to about 220° C. for the remainder of the time. If the material starts to solidify prematurely, the temperature should be raised to 245° C. until the material remelts and then lowered again to 220° C. Higher temperatures during melt polymerization are less desirable because the product is discolored. Darkening of the polymer occurs toward the end of the melt polymerization, when the melt becomes suddenly more viscous. At temperatures around 245° C. the material discolors rapidly and temperatures as high as this should be used only for short times. Such discoloration can be reduced by the use of stabilizers such as triphenyl phosphite and methoxyacetic acid.

The final step of the process is a powder polymerization at temperatures above 215° C. and below the melting point of the material, and continued for sufficient time to form a highly polymerized polyhydroxyacetic ester of the desired plastic properties. Preferably this polymerization is conducted at a temperature of about 220° C. for 8 to 24 hours under a high vacuum, i. e., within the range of 0 to 5 mm. of mercury absolute pressure. This polymerization is conducted with material from the melt polymerization, which is cooled, broken up, and ground to a powder, preferably of sufficient fineness to pass a 20 mesh screen.

It has been found that the presence of triphenyl phosphite stabilizer during this polymerization is a distinct advantage, yielding a product which is practically colorless and which exhibits better stability to degradation at extrusion temperatures. The stabilizer may be added to the melt at any time. For appreciable effectiveness the amount of triphenyl phosphite should not be less than 0.05%, based on the weight of hydroxyacetic acid used, and best results are obtained with 0.1% to 0.15%. Greater amounts are not desirable because the stabilizer reduces the molecular weight obtained under otherwise comparable conditions. Similar results are obtained with methoxyacetic acid, although it is less effective.

Certain materials have been found to be valuable as polymerization catalysts, and can be used either to obtain a higher degree of polymerization or to shorten the time required for polymerization, or both. Antimony trioxide is a desirable catalyst when used in amounts of about 0.01% of the weight of hydroxyacetic acid. Amounts as great as 0.02% cause darkening of the polymer, although a high melt viscosity is obtained. Dibutyl tin dilaurate is a less effective catalyst and should be used in amounts of about 0.1% of the weight of hydroxyacetic acid.

The invention will now be illustrated by the following examples, which are not to be construed as limiting the invention.

EXAMPLE 1

A one-liter flask was used as a reaction vessel.

The flask was provided with two necks, one of which was large enough to permit insertion of a stirrer, and the other was arranged for downward distillation. Both necks carried ground joints far enough removed from the bulb of the flask to avoid excessive heat. A bath of silicone oil was provided for heating the bulb of the flask.

There was charged into the flask 1000 grams of hydoxyacetic acid, 1 gram of triphenyl phosphite and 0.1 gram of antimony trioxide. The flask was thoroughly flushed with nitrogen and lowered into the oil bath, which had been heated to 245° C. The temperature of the bath dropped rapidly to 180° and was reheated to 200° as the acid melted. The bath was held at 200° while the water of reaction distilled off, using a nitrogen stream to stir the acid and facilitate boiling. A nitrogen stream was used because metal stirrers, such as stainless steel or Monel metal, are corroded by the acid.

After about 1.5 hours the water of reaction had ceased distilling and the pressure was gradually lowered over a period of 0.7 hour to a range of 1 to 5 mm. of mercury. The vacuum was then temporarily released while a Monel metal half-moon stirrer was inserted in the melt. The flask was again placed under a vacuum of 1 to 5 mm. pressure and the temperature was raised slowly over a period of 0.7 hour to 220°. Glycolide distills almost as soon as the pressure is reduced and the use of heat lamps is necessary to prevent plugging of the exit tubes. The system was held at 220° under the best vacuum obtainable with the mechanical pump for about 11 hours until the glycolide ceased distilling. This was done on an interrupted basis, remelting the polymer at 245° when solidification occurred. Up to this point in the process there were obtained 462 grams of polymer, 140 grams of solid glycolide and 258 grams of liquid distillate, leaving 140 grams of the original 1000 grams unaccounted for.

The polymer was broken up and ground to sufficient fineness to pass a 20-mesh screen. The powder was returned to the flask used for the melt polymerization and heated for 24 hours at 218° under vacuum with stirring. Only 5 to 10 grams of glycolide distilled during this time. There was obtained a 60% of theoretical yield of polymer, having a melt viscosity of 2000 poises and an intrinsic viscosity of 0.7.

EXAMPLE 2

The polymer prepared in Example 1 was extruded into film by the following procedure:

The polymer was dried at 140° at 5 mm. of mercury absolute pressure in a stream of nitrogen for sixteen hours. A piston-feed melt extrusion machine having a 5-inch hopper and 200 gram capacity was thoroughly flushed with nitrogen and charged with the dry polymer while flushing with nitrogen. The extrusion cylinder and hopper lips were maintained at 245° C. to 250° C. during extrusion. The film was extruded directly into a tank of water placed about ¼ inch from the hopper lips. Good quality clear, colorless, self-supporting film of about 3 mils thickness was formed which was flexible and tough. The physical properties of the film, when evaluated by standard tests initially and after various intervals, are shown in Table I. There was no change in appearance of the film during the time of the test.

*Table I*
PROPERTIES OF EXTRUDED FILM

| Property Tested | Initial Value | After 2 weeks | After 1 month | After 2 months |
|---|---|---|---|---|
| Tensile (Scott 1 inch): | | | | |
| Transverse Direction, lbs./sq. in | 5,300 | 6,230 | 7,120 | 4,900 |
| Machine Direction, lbs./sq. in | 5,470 | 4,500 | 4,820 | 3,900 |
| Elongation (Scott 1 inch): | | | | |
| Transverse Direction percent | 10 | 6 | 6 | 6 |
| Machine Direction do | 10 | 6 | 6 | 5 |
| Flex | 1,326 | | | |
| Pendulum Impact, kg. cm | 0.58 | | | |
| Tear (Elmendorf): | | | | |
| Transverse Direction, grams | 77 | | | |
| Machine Direction, grams | 64 | | | |

The film can readily be given a two-way draw at 50° C. with accompanying orientation and increase in strength. Film was clamped between two pairs of jaws in a heated box and the jaws were separated slowly to elongate the film. In this way film was stretched to 3 times its length in the transverse direction, and then 2 times in the machine direction. There was a marked increase in strength in the pendulum impact test to over 3 kg. cm. per mil of thickness. Stretching also improves the resistance to water. Stretched film was heat-set for 3 hours at 50° C. and was then stored in water at 25° C. for 3 weeks. The film remained clear and was substantially unaffected.

EXAMPLE 3

A polymer having a lower melt viscosity of 975 poises, an intrinsic viscosity of 0.65 and stabilized with 0.05% triphenyl phosphite, but containing no antimony oxide or other catalyst, was prepared as in Example 1. The polymer was extruded into film as in Example 2, except that lower temperatures had to be used to minimize degradation of the polymer, the cylinder being at 230° and the hopper lips at 235° to 240°. The film was colorless, but was granular in appearance and contained minute unmelted particles of polymer.

An attempt to extrude unstabilized polymer into film under the same conditions resulted in excessive degradation of the polymer to a melt viscosity of only 500 poises, and the film obtained was dark brown in color. Apparently this viscosity was borderline for film extrusion, since the material had a tendency to drip from the hopper and holes appeared spontaneously in the film a few millimeters from the hopper lips. Attempts to extrude polymer of still lower viscosity into film were unsuccessful because the molten material dripped from the hopper lips and no film was obtained.

EXAMPLE 4

A 30-gram batch of hydroxyacetic acid was polymerized by melting it and distilling off water at 197° C. and atmospheric pressure for 0.5 hour, heating the molten material and distilling off glycolide under a vacuum of less than 1 mm. of mercury absolute pressure at 197° for 1.2 hours followed by 218° for 4.5 hours, and finally heating the material in powder form under the same high vacuum at 218° for 24 hours. The polymer obtained had a melt viscosity of about 7000 poises and an intrinsic viscosity of 0.9.

Table II compares the effect on the viscosities of polymers obtained under comparable conditions when polymerization is conducted in the presence of varying amounts of triphenyl phosphite stabilizer, and of polymerization catalysts in addition to stabilizer. All of the polymers were substantially colorless with the exception of Example 9 which was unsatisfactory.

Table II

| Example No. | 4 | 5 | 6 | 7 | 8 | 9 | 10 |
|---|---|---|---|---|---|---|---|
| Triphenyl Phosphite percent | 0 | 0.05 | 0.1 | 0.15 | 0.1 | 0.1 | 0.1 |
| Antimony trioxide do | 0 | 0 | 0 | 0 | 0.01 | 0.02 | 0 |
| Dibutyl tin dilaurate do | 0 | 0 | 0 | 0 | 0 | 0 | 0.1 |
| Melt viscosity, poises | 7,000 | 5,000 | 1,000 | 1,400 | 7,000 | 27,000 | 3,000 |
| Intrinsic viscosity | 0.9 | 0.9 | 0.65 | 0.67 | 0.95 | 1.20 | 0.87 |

EXAMPLES 11 AND 12

Two batches of hydroxyacetic acid were polymerized under comparable conditions except for the following differences in heating times:

| Process Step | Time, Hours | |
|---|---|---|
|  | Ex. 11 | Ex. 12 |
| Atmospheric distillation at 197° C | 0.5 | 0.5 |
| Vacuum melt polymerization at 197° | 1.2 | 1.2 |
| Vacuum melt polymerization at 218° | 3.5 | 0.9 |
| Vacuum powder polymerization at 218° | 8.0 | 12.0 |
| Intrinsic viscosity of product | 0.89 | 0.27 |

The total heating time at 218° C. was slightly longer in the case of batch Example 12, but because of the short melt part of the cycle (0.9 hour) this polymer had a much lower intrinsic viscosity.

An attempt was made to eliminate the powder polymerization step by extending the melt polymerization time, using a temperature of 245° C. to keep the material molten. The temperature of 245° C. caused the acid to discolor in less than ten minutes and after one hour the polymer was black. In another experiment, hydroxyacetic acid containing 0.1% of triphenyl phosphite stabilizer was heated at atmospheric pressure for 0.4 hour and then under vacuum at 245° C. for 7.2 hours. The resulting material was tan and had an intrinsic viscosity of only 0.33. From these experiments it is evident that the melt and powder polymerization steps are interrelated and must be properly coordinated.

EXAMPLE 13

Sixteen-gram batches of the polymers prepared in Examples 4 and 11 were press spun into fibers at a temperature of 225° to 235° C., using a wind-up speed of 130 to 190 feet per minute. Smooth, strong 40 denier fibers were obtained which would cold draw. The optimum draw temperature was 50° to 60°, in which range these fibers could be drawn to from 2 to 6 times their original length without difficulty. The physical properties of fibers drawn to 5 times the original length are shown in Table III.

Table III
PROPERTIES OF DRAWN FIBERS

| | | |
|---|---|---|
| Intrinsic viscosity of polymer before spinning | 0.9 | 0.89 |
| Intrinsic viscosity of fiber | 0.57 | 0.55 |
| Tenacity, grams per denier | 4.4 | 4.0 |
| Elongation percent | 14 | 12 |

EXAMPLE 14

A polymer having a melt viscosity of 500 poises, an intrinsic viscosity of 0.52 and stabilized with 0.15% triphenyl phosphite, but containing no catalyst, was prepared by reducing the powder polymerization time of the process described in Example 1. The polymer was readily molded into test bars for the standard ASTM Izod notch impact test for toughness. An impact value of 0.64 foot-pounds per inch of notch was obtained in the test, which is about the same value obtained with such commercial plastics as polystyrene, methyl methacrylate and cast phenolic resin.

The above examples have demonstrated that the present invention provides useful polyhydroxyacetic esters of plastic properties and capable of being formed into strong, self-supporting fibers of films and tough molded articles by ordinary methods for working up plastics. Some of the marked distinctions between the new plastic and the prior art materials mentioned early in the specification are shown in Table IV. In this table, properties of a polymer prepared essentially as described in Example 1 of the present application are compared with a product prepared exactly as described in Example 2 of British Patent No. 550,837, and with a product prepared by the process of Bischoff and Walden reported in Liebig's Annalen der Chemie, volume 279, pages 46 to 48.

Table IV

| Test | Present Application | Br. Pat. 550,837 | Bischoff and Walden |
|---|---|---|---|
| Melting Point, °C | 232–233 | 214–215 | 222–223 |
| pH Value | 7.05 | 3.47 | 6.2 |
| Hydrolytic Stability percent | 0.27 | 10 | 2 |
| Intrinsic Viscosity | 0.58 | 0.14 | 0.17 |
| Infrared Absorption, O—H/ C—O—C | 1.78 | 6.67 | 6.25 |
| Melt Viscosity (245°), poises | 2400 | 3 | 8 |
| Manually Spinnable? | Yes | No | No |
| Film Forming? | Yes | No | No |
| Moldable? | Yes | No | No |

The melting point was determined by the usual method in which particles are placed in a capillary tube and observed with a low power microscope as the temperature is slowly raised. Hydrolytic stability was determined by grinding the material to pass a 20-mesh screen, boiling 1 gram of the powder in 50 ml. of water for 30 minutes, cooling the mixture, titrating with base, and expressing the result as percent hydrolysis. Manual spinnability was tested by melting the material, touching the surface with a stirring rod, and then drawing the rod away slowly to form a fiber. Since temperature can be a factor in this test the material was heated to a temperature not more than a degree or two above the melting point in each case. The tests for intrinsic viscosity and infrared absorption ratio have been discussed previously.

Some of the comparative information cannot be reduced to numbers. In Example 14 the new plastic was shown to have a toughness of 0.64 foot-pounds per inch of notch in the Izod impact test. No value could be obtained for the two prior art materials because the test bars necessary for the measurement were too brittle to be removed intact from the mold. As disclosed in Example 2, the new plastic can readily be extruded into self-supporting thin films which are tough, flexible, and remain unchanged in appearance and properties for long periods of time. On the other hand, the two prior art materials could not be fabricated into film with conventional equipment, and films had to be prepared by spreading a melt of the material on a chromium plate. These films did not have the properties associated with wrapping-type films. They were 10 to 20 times as thick as commercial cellophane, for example, and they invariably became opaque and so brittle that they fractured at a touch within two or three days.

As many different embodiments of the present invention may be made without departing from the spirit and scope thereof, it is to be understood that the invention is not limited to the specific embodiments disclosed except to the extent defined in the appended claims.

What is claimed is:

1. Polyhydroxyacetic ester condensate of hydroxyacetic acid having a melt viscosity at 245° C. of from 400 to 27,000 poises.

2. Polyhydroxyacetic ester condensate of hydroxyacetic acid having an intrinsic viscosity of from 0.5 to 1.2.

3. Polyhydroxyacetic ester condensate of hydroxyacetic acid having a melt viscosity at 245° C. of from 1000 to 10,000 poises.

4. Polyhydroxyacetic ester condensate of hydroxyacetic acid having an intrinsic viscosity of from 0.65 to 1.0.

5. Polyhydroxyacetic ester condensate of hydroxyacetic acid stabilized with triphenyl phosphite and having a melt viscosity at 245° C. of from 400 to 27,000 poises.

6. A process for polymerizing hydroxyacetic acid which comprises heating and distilling water rapidly from hydroxyacetic acid at substantially atmospheric pressure and at temperatures up to about 205° C. until rapid evolution of water ceases, heating and distilling glycolide from the resulting material under vacuum and at temperatures above the melting point of the material but below 245° C. until appreciable evolution of glycolide ceases, cooling the material, powdering the material, and heating the powder at temperatures above 215° C. but below the melting point until a polyhydroxyacetic ester having a melt viscosity at 245° C. of not less than 400 poises is formed.

7. A process for polymerizing hydroxyacetic acid which comprises heating and distilling water from hydroxyacetic acid at substantially atmospheric pressure and at temperatures of 195° to 205° C. until rapid evolution of water ceases, heating and distilling glycolide from the resulting material under vacuum and at temperatures above the melting point of the material but below 245° C. until appreciable evolution of glycolide ceases, cooling the material, powdering the material, and heating the powder under vacuum and at temperatures above 215° C. but below the melting point until a polyhydroxyacetic ester having a melt viscosity at 245° C. of not less than 1000 poises is formed.

8. A process for polymerizing hydroxyacetic acid which comprises heating and distilling water from hydroxyacetic acid at substantially atmospheric pressure and at temperatures which are low enough to avoid excessive side reactions until rapid evolution of water ceases, heating and distilling glycolide from the resulting material under vacuum and at temperatures above the melting point of the material but below 245° C. until appreciable evolution of glycolide ceases, cooling the material, powdering the material, and heating the material in the presence of triphenyl phosphite stabilizer which has been incorporated in the material prior to cooling and powdering steps, at temperatures above 215° C. but below the melting point until a polyhydroxyacetic ester having a melt viscosity at 245° C. of not less than 400 poises is formed.

9. A process for polymerizing hydroxyacetic acid which comprises heating and distilling water from hydroxyacetic acid in the presence of not less than 0.05% of triphenyl phosphite stabilizer, based on the weight of acid at substantially atmospheric pressure and at temperatures which are low enough to avoid excessive side reactions until rapid evolution of water ceases, heating and distilling glycolide from the resulting material under vacuum and at temperatures above the melting point of the material but below 245° C. until appreciable evolution of glycolide ceases, cooling the material, powdering the material, and heating the powder at temperatures above 215° C. but below the melting point until a polyhydroxyacetic ester having a melt viscosity at 245° C. of not less than 400 poises is formed.

10. A process for polymerizing hydroxyacetic acid which comprises heating and distilling water from hydroxyacetic acid in the presence of not less than 0.05% of triphenyl phosphite stabilizer and 0.005 to 0.02% of antimony trioxide catalyst, both based on the weight of acid, at substantially atmospheric pressure and at temperatures which are low enough to avoid excessive side reactions until rapid evolution of water ceases, heating and distilling glycolide from the resulting material under vacuum and at temperatures above the melting point of the material but below 245° C. until appreciable evolution of glycolide ceases, cooling the material, powdering the material, and heating the powder at temperatures above 215° C. but below the melting point until a polyhydroxyacetic ester having a melt viscosity at 245° C. of not less than 400 poises is formed.

11. Self-supporting thin films of polyhydroxyacetic ester condensate of hydroxyacetic acid having an intrinsic viscosity of from 0.65 to 1.0.

12. Oriented thin films of polyhydroxyacetic ester condensate of hydroxyacetic acid having a melt viscosity at 245° C. of from 1000 to 10,000 poises.

13. As a wrapping tissue, oriented films having a thickness of the order of 1 mil of polyhydroxyacetic acid condensate of hydroxyacetic acid having a melt viscosity at 245° C. of from 1000 to 10,000 poises.

14. Strong orientable fibers of polyhydroxyacetic acid condensate of hydroxyacetic acid having an intrinsic viscosity of from 0.5 to 1.2.

15. Oriented strong fibers of polyhydroxyacetic acid condensate of hydroxyacetic acid having an intrinsic viscosity of from 0.5 to 1.2.

References Cited in the file of this patent

UNITED STATES PATENTS

| Number | Name | Date |
| --- | --- | --- |
| 1,095,205 | Gruter | May 5, 1914 |
| 1,976,359 | Murray | Oct. 9, 1934 |
| 1,995,970 | Dorough | Mar. 26, 1935 |
| 2,362,511 | Teeters | Nov. 14, 1944 |
| 2,437,046 | Rothrock et al. | Mar. 2, 1948 |

FOREIGN PATENTS

| Number | Country | Date |
| --- | --- | --- |
| 550,837 | Great Britain | Jan. 27, 1943 |
| 583,268 | Great Britain | Dec. 13, 1946 |

OTHER REFERENCES

Bischoff et al., Ann., 279, 46–48.

Heintz, Ann. der Phip. v. Chem., 115, 461.